July 8, 1958 P. AMERIO ET AL 2,842,253
CONVEYOR SYSTEM
Filed Aug. 28, 1957 4 Sheets-Sheet 1
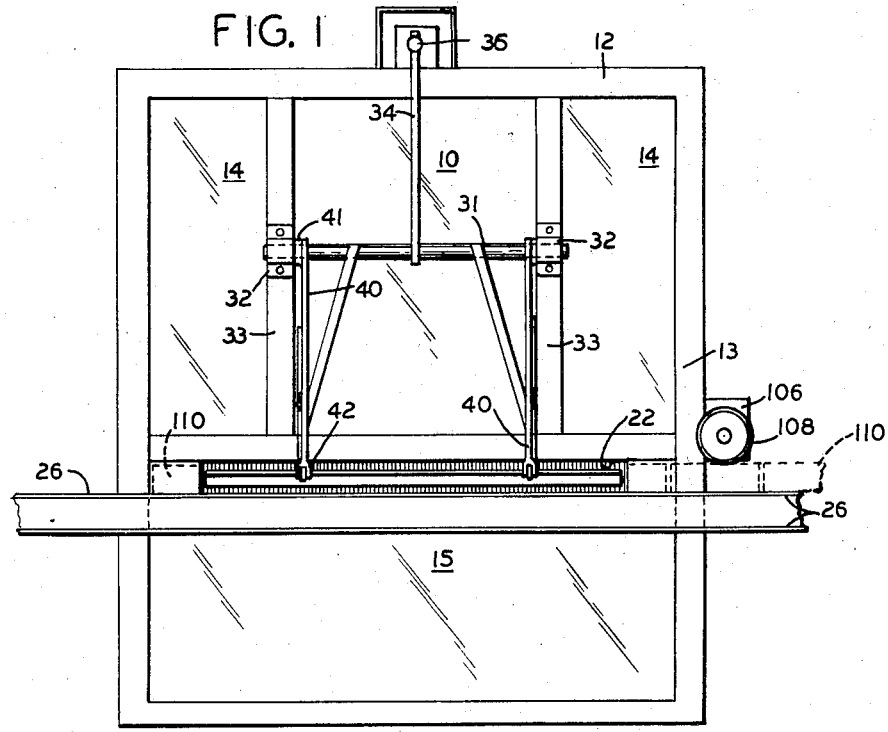
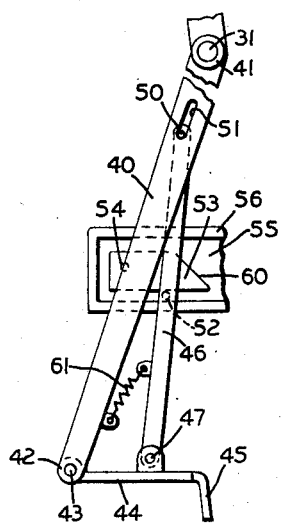
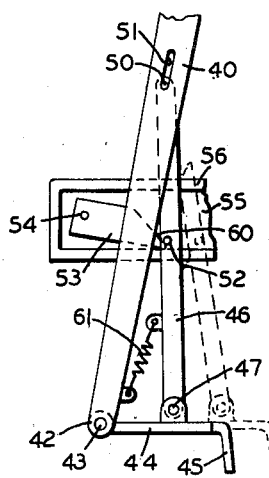
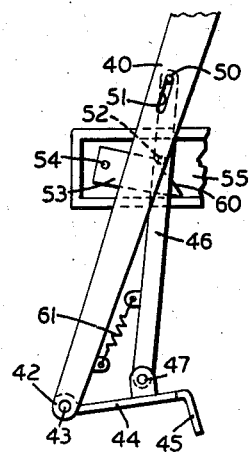
INVENTOR.
PASQUALE AMERIO
AUGUST KRAFT
BY John P. Chandler
THEIR ATTORNEY.

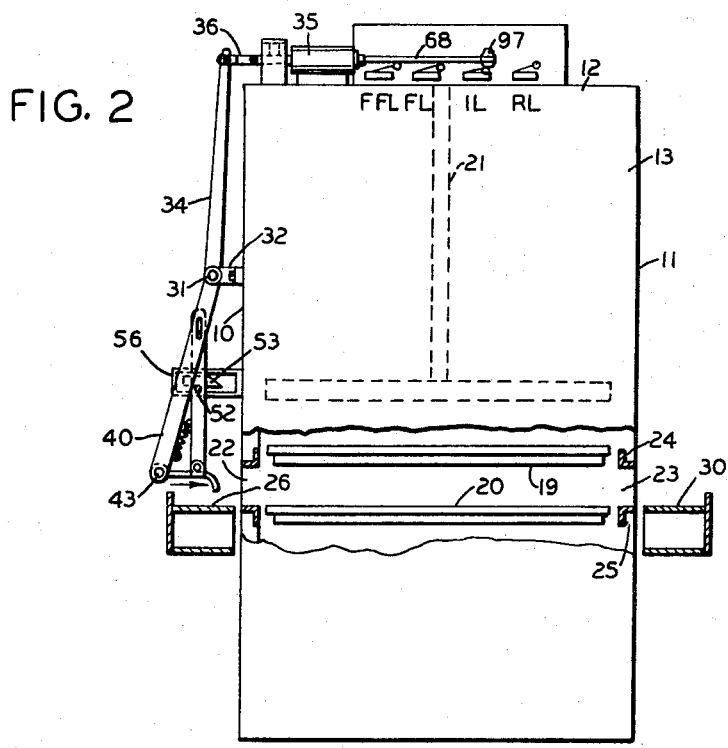
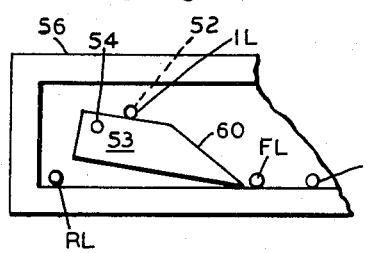
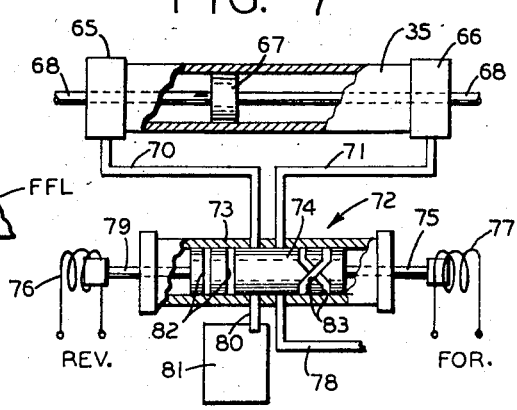

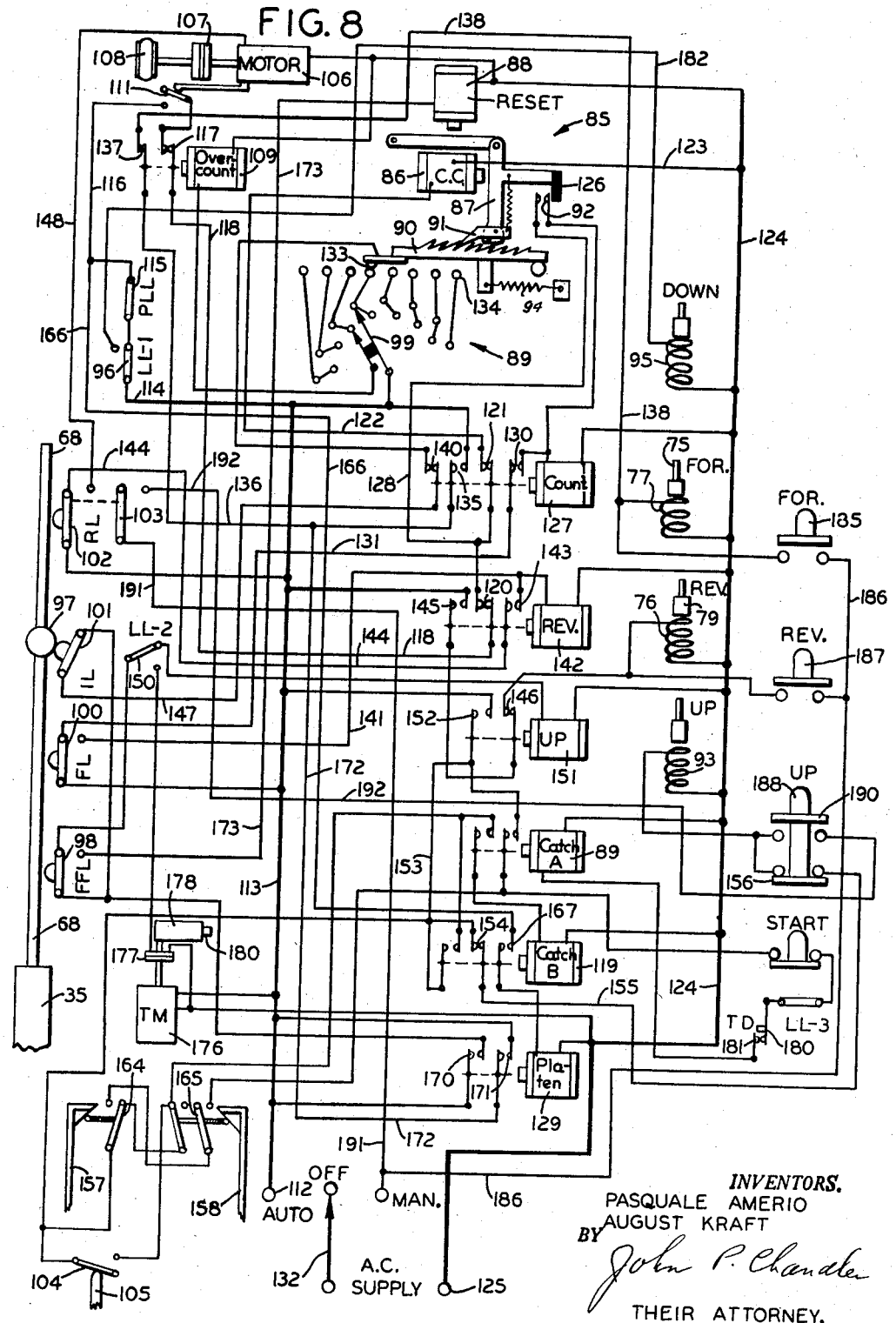

*INVENTOR.*
PASQUALE AMERIO
AUGUST KRAFT
BY John P. Chandler

THEIR ATTORNEY.

United States Patent Office 2,842,253
Patented July 8, 1958

2,842,253
CONVEYOR SYSTEM

Pasquale Amerio, Erskine Lakes, and August L. Kraft, Roselle Park, N. J., assignors to Amerio Refrigerating Equipment Co., Inc., Union City, N. J., a corporation of New Jersey Application August 28, 1957, Serial No. 680,735

4 Claims. (Cl. 198—31)

This invention relates to conveyor systems and relates more particularly to a loading system for commercial freezers of the type shown in our co-pending application Serial No. 600,529 employing a pusher assembly disclosed in our co-pending application Serial No. 599,749, now Patent No. 2,812,050. The present application constitutes a continuation-in-part of said applications.

The freezer disclosed in said first application has a narrow horizontal slot-like charging opening in one wall and a similar discharge opening in the opposite wall. A moving conveyor moves a group of boxes of unfrozen foods to a position in line with the charging opening and the pusher assembly then moves the boxes through the charging opening into a cavity between two freezer plates.

The present application is directed to the conveyor assembly and particularly to the means whereby the travel of the boxes is stopped during the period in which a full group of the boxes, assembled in front of the charging opening, is wiped off the conveyor and into the freezer.

In the drawings:

Fig. 1 is a front elevation of an apparatus embodying the present invention.

Fig. 2 is a side elevation thereof, partially in section.

Fig. 3 is a side elevation of the pusher assembly and showing the position of the pusher when it has about half completed its forward or loading stroke.

Fig. 4 is a similar view but showing the pusher as it commences its return stroke after the loading operation.

Fig. 5 shows the pusher in elevated position during the return stroke.

Fig. 6 shows diagrammatically the several positions of the pusher guide pin during its travel around the cam block during a complete cycle of operation.

Fig. 7 is a schematic diagram of the cylinder and piston which controls the pusher. The valve which operates it by electromagnetic control means is also shown.

Fig. 8 shows a circuit for controlling operation of the apparatus.

Fig. 9 is a broken section of the freezer and showing the mechanical details of the catch arms which support the platens during loading.

Figure 10:
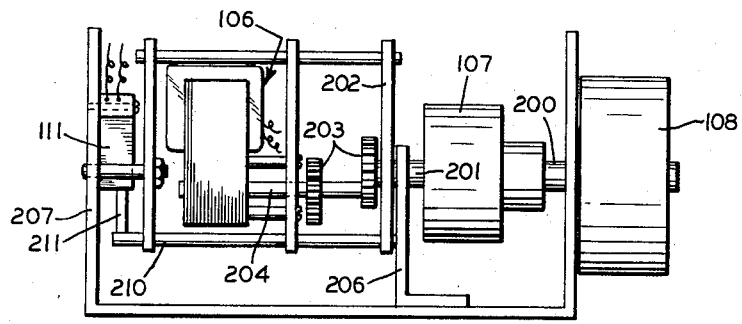
Fig. 10 is a side elevation of the sensing head.

The freezer may include a generally rectangular insulated housing having a front wall 10, a rear wall 11, a top wall 12 and side walls 13. The front wall may have two upper panels 14 and one lower panel 15 which are preferably removable in order to gain access to the interior.

Within the housing there are positioned a plurality of superimposed freezer plates, two of which are shown at 19 and 20. The construction and supporting means for the plates form no part of the present invention. Suffice it to say, however, that when the cavities between all of the plates have been filled with boxes of comestibles to be frozen the plates engage the boxes with a measure of pressure which continues during the freezing operation. The plates are suspended from a vertically movable hydraulic ram shown schematically at 21 and the whole bank of plates is intermittently moved up and down to successively position two adjacent plates in horizontal alignment with elongated openings 22 and 23 in the front and rear walls, respectively. Each opening is shown as being defined by upper and lower angle bars 24 and 25.

The two plates 19 and 20 shown as being in alignment with these openings having a spacing therebetween which is greater than the height of the boxes of comestibles in order that they may be readily moved into and out of the freezing area without obstruction.

A group of boxes of food are fed to a position in alignment with the elongated charging opening 22 by means of a conveyor which may comprise an endless belt 26, which moves the boxes downstream until the first box in the group contacts a fixed stop 27 at the downstream end of opening 22. The length of each plate is sufficient to support ten to twenty boxes in side by side relation and the width of the plate is sufficient to receive a given number of rows, dependent upon the size of the boxes. When one cavity is filled a new one is presented and this continues until the freezer is filled and the freezing continues during the loading operation. The actual time for filling the freezer may take only 10 to 15 minutes and after filling the goods are allowed to complete their freezing period after which the boxes are removed as the unfrozen boxes are again moved into the freezer. The unfrozen boxes are soft and the frozen boxes have congealed to the plates. Accordingly the first step in the new cycle is to move the pusher against the last group to break this bond. The discharging and refilling then starts and the cycle repeated. The frozen boxes are discharged through rear wall opening 23 onto a second moving conveyor 30.

The pusher assembly includes a bell crank arrangement comprising a shaft 31 journalled at its ends in bearings 32 carried on vertical frames 33. Rocking motion is imparted to the shaft by means of an upper lever 34 keyed thereto which is moved back and forth by a piston in cylinder 35 connected by a link 36 to lever 34.

The bell crank lever further includes two lower rocker arms 40 keyed to the shaft at 41 and at the lower end a clevis 42 is formed which receives a pivot pin 43 forming a support for a rearward extension 44 of a pusher bar 45 of angular construction.

When the pusher bar moves forwardly it is in its lowermost position of Fig. 3 and during its return stroke it is in the raised position of Fig. 5 in order to clear the new row of boxes which are being delivered to the charging opening during this return stroke. Up and down movement of the bar is controlled by an auxiliary lever 46 pivoted at its lower end at 47 on the pusher bar and having a pin 50 at its upper end which is positioned in a vertical slot 51 in rocker arm 40. Movement of each lever is controlled by means of a pin 52 carried thereby which is guided around a cam block 53 pivoted at 54 on a flat cam support 55 having a flange 56 around its top, bottom and rear edges. Cam block 53 is generally rectangular except for a downwardly inclined front edge 60.

During forward travel of the pusher, pin 52 underlies the cam block and such pin is supported on lower flange 56. When this pin clears the forward point of the block the front end of the latter falls to the position of Fig. 4 due to gravity and at this moment the pusher commences its rearward travel with the pin climbing the diagonal edge. Cam supports 55 are secured to frames 33. A spring 61 provides a positive drive downwardly for lever 46. The pusher is shown in an advanced position in Fig. 5 in broken lines. This additional stroke is employed to break all the boxes loose from the freezer plate after freezing has been completed.

The cycle of operation is illustrated diagrammatically in Fig. 6. Pin 52, which controls travel of the pusher bar and which travels around and forwardly of cam block 53, is shown in four positions, to wit: IL (intermediate limit or starting position); RL (rear limit or position for starting forward box feeding stroke); FL (forward limit during box feeding stroke); and FFL (full forward limit at the end of the breakaway stroke).

Details of the cylinder 35 are shown in Fig. 7. The cylinder includes two heads 65 and 66, and a piston 67, which is secured to a shaft 68 extending through both heads. In order to move the piston in both directions a liquid under pressure is supplied through two conduits 70 and 71 coupled to the two heads. The conduits are connected to a reversing valve 72 which includes a cylinder 73, a valve piston 74, and shafts 75 and 79, which are controlled by two solenoids 76 and 77. Fluid under pressure is supplied to an inlet conduit 78 and an outlet conduit 80 discharges into a storage tank 81.

When current is applied to the For solenoid 77 shaft 75 is pulled to the right, thereby aligning two straight vents 82 with conduits 70, 80 and 71, 78 and allowing liquid to flow from conduit 78 through conduit 71 to head 66 and move the piston 67 to the left. As the piston moves to the left, liquid will be forced through head 65, conduit 70, the left vent 82, through conduit 80, and into storage tank 81. When current is removed from solenoid 77, the shaft 75 and the valve piston 74 are returned to the "off" position by a spring (not shown) and the movement stops.

Piston 67 is moved to the right (and the pusher to the left as seen in Fig. 2) by the actuation of solenoid coil 76 and a movement of shaft 75 to the left. This action aligns crossed vents 83 and the liquid under pressure is admitted to head 65.

Control for the pusher 45 and the operation of cylinder 35 is effected by a counting and control circuit shown in schematic form in Fig. 8. The counting control includes a counting relay assembly which comprises a count control winding 86, an armature 87, a reset winding 88, a rack bar 90 driven by a pawl 91 on the armature, a pair of normally open contacts 92 closed each time the armature is actuated, and a plurality of contacts 89 associated with a pre-set dial contact means 99 which will be described later.

The control circuit also includes seven relays. The function of these relays may be generally described as follows: A count relay 127 is operated each time the contacts 92 are closed. This relay operates the forward (For) solenoid 77 and thereby operates the pusher. A reverse relay 142 is operated by a forward limit switch (FL) and controls the reverse (Rev) solenoid 76, thereby moving the pusher back to its normal position. An Up relay 151 is operated by the "set count" contact in the pre-set dial array. The Up relay is operated each time a platen is filled with unfrozen boxes and its operation causes the actuation of a solenoid (Up) winding 93 to move an empty platen into the loading plane.

A catch (A) relay 89 is actuated by catch limit switches which are operated when another platen has been raised slightly above its loading position. When the catch relay 89 is actuated it causes the reset winding to be actuated and the release of rack bar 90. A spring 94 draws the rack bar back to its starting position and count control circuit 85 is then in its normal condition, ready to start a new count. A catch (B) relay 119 is also actuated by the catch—limit switches, acting through contacts on the Up and catch (A) relays. When this relay is actuated, the Up solenoid is de-energized and the platen to be filled is lowered slightly against stops. The platen is now ready to receive unfrozen boxes.

A platen relay 129 is actuated by platen loading limit (PLL) switches acting through contacts on relay 119. The platen relay causes the pusher arm to go to its full forward limit to break loose the frozen boxes. An overcount relay 109 is actuated only when an overcount has been made by the count circuit 85. When the overcount relay is actuated, all operations stop and an attendant must inspect the control system and reset the count dial before operations can continue.

The control circuit also includes a solenoid 95 which is operated when all the platens have been filled and the platen assembly is in its lowest position, in the act of being frozen. Solenoid 95 (Down) is energized through a lower limit switch 96 (LL-1) and exerts a light pressure on the platen assembly to cause complete contact of platen surfaces and boxes.

The control circuit also includes four switches which are operated by a contact knob 97 on shaft 68. The switches are actuated when the pusher bar 45 is in predetermined positions. When the bar is in its full forward limit of breaking loose frozen boxes, switch 98 is actuated. When the bar is in the usual forward limit (FL) after having pushed a row of boxes onto a platen, switch 100 is actuated. When the bar is in its intermediate position (or starting position) (IL) switch 101 is actuated as shown in Fig. 7. When the bar is in its rear limit position (RL) switches 102 and 103 are actuated.

When the platen assembly is raised and each platen area is filled, the top platen surface is raised toward the top wall and when the last platen area has been filled, an additional upward motion closes an upper limit switch (UPL) 104 by contact with a rod 105 which is secured to the top platen and extends through a hole in the upper wall 12.

A box sensing means comprising a sensing head is mounted over the endless belt 26 (Fig. 1) to sense a full row or group of boxes on the belt. The sensing head includes a motor 106 in a flexible housing having a shaft which connects with an overrunning clutch 107 (see Figs. 8, 10 and 11). The other side of clutch 107 is connected to a soft wheel 108 which is mounted so as to make contact with the top surfaces of the unfrozen boxes 110 (shown in dotted lines) as they are moved into position by the belt 26. The details of construction of the sensing head are described in greater detail later but for present purposes suffice it to say that during the loading operation motor 106 is running, because its supply circuit is connected through switch 102, and belt 26 is arranged to move the boxes under wheel 108 at a rate which turns the soft wheel faster than the motor is geared to turn it. As long as the boxes move under the wheel, there is no strain put on the motor since the overrunning clutch permits the wheel to move faster than the motor shaft. As soon as a group in the two groups are filled with boxes wheel 108 is restrained in its movement, a strain is but on the motor, and the motor housing 106 is rocked, thereby closing a switch 111 and sending current through winding 86 of the counter relay 127, causing its armature to be actuated to move rack bar 90 one contact space. This also causes the pusher to move forward and wipe the group of boxes off the conveyor. This circuit may be traced from terminal 112, over conductors 113 and 114, through switches 96 and 115, over conductor 116, to switch 111, then through closed contacts 117 on the overcount relay 109, over conductor 118, through contacts 120 of the relay, contacts 121 of the count relay, over conductor 122, to the count control winding 86, and then over conductors 123 and 124, to terminal 125.

When the armature 87 of the count relay is actuated, an insulated portion of the armature 126 closes contacts 92 and causes current to flow through winding 127 of the count relay. This circuit may be traced as before, through contacts 120 of the reverse relay, over conductor 128, through contacts 92, winding 127, and conductor 124. As soon as the count relay is actuated, contacts 121 are broken and the current is cut off from winding 86. However, holding contacts 130 are closed and the count relay is held in its actuated condition by a circuit which can be traced from conductor 124, through winding 127, contacts 130, conductor 131, through the forward limit switch 100, to conductor 113. During this part of the loading operation shaft 68 is positioned so that knob 97 is actuating switches 102 and 103.

A complete cycle of one platen loading operation may be described as follows: With the pusher bar 45 in its rear position and shaft 68 causing the actuation of switches 102 and 103, main switch 132 is moved to "Auto" and the sequence of operations as described above takes place. Prior to moving the switch 132 to start the automatic operation, dial switch 99 is set at a contact point which represents the number of rows of boxes which can be placed on the platen and the rack bar 90 is in its starting position where movable contact 133 makes electrical contact with stationary contact 134.

When the count relay is actuated, contacts 135 are closed and a circuit is completed through the forward solenoid 77. This circuit may be traced from conductor 113, through contacts 135, over conductor 136, through closed contacts 137 of the overcount relay, over conductor 138, to winding 77, and conductor 124. This circuit causes the movement of plunger 75 (see Fig. 7) and presents vents 82 to the hydraulic system so that piston 67 is moved to the left, moving linkage 36 and bar 34 (see Fig. 2) so that the pusher 45 is moved against the boxes and pushes them onto the platen, this position of the pusher being indicated by dotted lines in Fig. 4. When the knob 97 is moved away from switches 102 and 103, the circuit to the motor 106 is broken and the motor stops and contacts 111 are opened. However, boxes still move along the belt and form a second row, ready for the next operation of the pusher.

As the pusher moves the boxes in the first group into the platen, the constantly moving conveyor tries to move the boxes located upstream of the first group downstream and as soon as the pusher moves the first group off the conveyor the next group is free to travel downstream to the stop. During this movement of the pusher knob 97 moves to the left as viewed in Fig. 2 and closes the intermediate limit switch 101. This switch operation causes no action at this time because one terminal of the switch is connected to normally closed contacts 140 (on the count relay) which are now open. The pusher continues its motion until knob 97 makes contact with the forward limit switch 100, breaking the holding circuit of the count relay (overconductor 131) and normalizing all of its contacts. Contacts 135 are opened and this break cuts off the current from the forward solenoid winding 77 and the motion of piston 67 and pusher 45 stops. At this time, with the count control relay again in operating condition, no count action occurs because the sensing motor 106 cannot turn (switch 102 being normalized) and the sensing contacts 111 cannot close even though a full row of packages are on the conveyor belt.

When the forward limit switch 100 is actuated, the count relay is normalized and the reverse relay is actuated since a circuit is completed from conductor 113, through switch 100, over conductor 141, to the reverse relay winding 142, and to line conductor 124. As soon as the reverse relay is actuated, a holding circuit is formed which retains the armature in its actuated condition. This holding circuit may be traced from conductor 124, through winding 142, through holding contacts 143, over conductor 144, through switch 102, and to conductor 113. The count relay is now normalized because the holding circuit through switch 100 is broken. The actuation of the reverse relay opens contacts 120 and closes contacts 145 which completes a circuit from conductor 113, through contacts 145 of the reverse relay and contacts 146 of the Up relay, to winding 76 of the reverse solenoid, and conductor 124. This actuates plunger 79 and valve piston 74 (see Fig. 7) is moved to the left, aligning the crossed vents 83 with the hydraulic system and moving piston 67 and shaft 68 to the right as seen in Figs. 2 and 7. This action moves the pusher to the left as viewed in Fig. 2 and the pin 52 climbs the diagonal edge of cam block 53, moving the pusher over the row of boxes on the belt.

In moving from the forward limit switch 100 to the rear limit switch 102, the knob 97 passes and actuates the intermediate limit switch 101 but no circuit is completed since one terminal of the switch is connected (conductor 147) to contacts 140 on the count relay and moving contact 133 on rack bar 90. Contact 133 has been moved one space to the second contact position and therefore this line is open.

When the shaft 68 is moved so that knob 97 actuates switches 102 and 103 the reverse relay is normalized since switch 102 was in series with its holding circuit. At this time the sensing motor is started again because switch 102 sends current over conductor 148, through the motor to conductor 124. The row of boxes on belt 26 is generally completed during the return stroke of the pusher mechanism, hence the wheel 108 will cause the motor 106 to close switch 111 and another counting sequence is started. The cycles of operations are the same as before except that the movable contact 133 in the counting circuit is moved another point to the left.

The above described procedure is repeated many times, each cycle moving one row of packages or boxes from the conveyor belt onto the platen. The number of rows of boxes must be predetermined and set in the dial contact switch arm 99. Then when the required number of cycles has been operated and the platen is full, contact 133 will rest on a stationary contact which is connected to the dial arm as indicated in Fig. 8. Then as the pusher is withdrawn from the platen stroke and the shaft 68 moved to the right, knob 97 operates intermediate switch 101 and this time a circuit is completed which may be traced from conductor 113 to dial switch arm 99, to contact 133, closed contacts 140 on the count relay, over conductor 147, through switch 101, through switch 98, through the second lower limit switch 150, to the winding of the Up relay 151, and conductor 124. This circuit operates the Up relay, opening contacts 146 and breaking the circuit through the reverse solenoid, stopping the reverse movement of the pusher at the intermediate position.

The actuation of the Up relay also closes contacts 152, completing a circuit from conductor 113, through contacts 152, over conductor 153, contacts 154 on the catch-B relay, over conductor 155, through manual switch contacts 156, to the winding 93 of the Up solenoid. This solenoid (in conjunction with the Down solenoid) controls a vertical hydraulic piston and cylinder mechanism similar in every respect to the mechanism shown in Fig. 7 except that the vertical piston is secured to a shaft which moves the platen array up and down. The Up and Down solenoids 93 and 95 control a valve similar to valve 72 shown in Fig. 7.

When the Up solenoid is actuated, the vertical piston moves all the platens up until two catch arms 157 and 158 move toward the center of the machine with their upper contact surfaces under the edges of the platen 19. Mechanical details of one of the catches 157 is shown in Fig. 9, the catch being urged toward the platens by a helical spring 160. The catch arms are mounted on a hinge 161 which is secured to the base of the machine. The platens 19 together with the boxes 110 which are to be frozen are enclosed in a framework which includes a top rod 162 and vertical rods 163. The hydraulic piston, similar to piston 67, which moves the platens up and down is secured to the framework 162, 163, and the entire array moved up and down together. When the two catch arms 157 and 158 (see Fig. 8) move under the platen surface they actuate two switches 164 and 165 moving them to the positions shown in Fig. 8. When both switches have been actuated and the circuit which includes the Up solenoid 93 is broken and the hydraulic piston which moved the platen array in an upward direction is disconnected and the platens together with their framework 162, 163 slowly settle until the platens held up by the catches are separated by a small distance from the boxes immediately below the upper catch surface. When this happens the top surface of the upper platen makes contact with the platen limit loading switch 115, closing a circuit through the switch and actuating the platen relay 129. This circuit can be traced from conductor 113 through switch 96, platen loading switch 115, conductor 166 through the closed contacts 167 on the catch B relay 119, then through the winding of the platen relay 129, to conductor 124. This circuit causes the actuation of the platen relay and closes contacts 170 and 171.

When the platen relay is actuated a circuit is completed through contacts 171 which may be traced as follows: From line 113, through closed contacts 137 of the overcount relay 109, over conductor 138, to the For solenoid 77, and line conductor 124. This circuit actuates valve 74 (Fig. 7) and operates piston 67 to propel the pusher from the intermediate position to the array of frozen food packages on the newly exposed platen to break them loose from the platen surfaces and prepare the platen for the next row of unfrozen boxes.

When the pusher is in all the way after having broken loose the frozen packages the knob 97 on shaft 68 makes contact with the full forward limit switch 98 operating it and breaking one circuit to the Up relay and closing another circuit to the reset coil 88. This action actuates the reset mechanism and releases rack bar 90 so that it is returned to its normal or zero count position by means of a spring. When switch 98 opens the circuit to conductor 173 to switch 150 and normalizes the Up relay the reverse solenoid is actuated because of a circuit which may be traced from conductor 124 through the solenoid winding 76, through closed contacts 146, through closed contacts 145, to the line conductor 113. The pusher returns all the way and operates the rear limit switch 102, breaking the current in conductor 144 and normalizing the reverse relay 142. This action opens contacts 145 on the reverse relay and cuts off the current in the reverse solenoid.

The pusher bar is now all the way out in its starting position; the rack bar 90 is in its zero position with contacts 133 resting against contacts 134 and all the relays have been normalized. This was the condition when the operation was started and the apparatus is now set to go through another full cycle to load the new platen. The above described controlled operation is performed over and over again as each platen is filled. When the last platen is filled the Up solenoid controls the vertical piston to move the platen array upward until a rod 105 secured to the upper portion of the platen frame 162 moves through a hole in the upper wall 12 and operates the upper limit switch 104, causing a circuit to be completed which actuates the catch-B relay winding 119, thereby breaking contacts 154 and cutting off the current through the Up solenoid winding 93. The platen array now drifts downwardly the entire distance and all the platens are lowered into a freezing well where they may all be frozen to the required temperature. The catches 157 and 158 are mechanically held away from the platen edges by means of a flat strip 174 and a pin 175 secured to the catch. As the platen array moves downward the pin 175 rides on the outside of strip 174 until the entire array of platens is in the lower position. At this point the pin 175 moves over the top of strip 174 and the catches are again permitted to make contact with the edges of the platen.

The platen array remains in its lowered position until all the boxes are frozen. At this time an operator may start another filling and freezing cycle by manually pressing the start button and starting another complete cycle as described above. However, if the freezing time is accurately known a timing device may be employed to start a new cycle by automatic means. The components of this circuit include a timing motor 176 which runs all the time, an electric clutch 177 secured to the shaft of the timer motor, a timer device 178 which may be a set of reduction gears set to operate a lever 180, and a pair of contacts 181 in series with the start button which are opened when lever 180 is operated. The operation of this circuit is obvious; as soon as the platen array settles to its lowest position a lower limit switch 150 is operated and contact is made which energizes the electric clutch 177. The timer motor 176 then turns the timer mechanism 178 until, after a predetermined length of time, lever 180 is operated and the timer contacts 181 are opened.

When the platen array is in its lowest position switch 96 is operated, thereby sending current from conductor 113 through switch 96, then over conductor 182 to the Down solenoid 95, and line conductor 124. The Down solenoid opens the valve which causes a slight pressure to be exerted on the platens to hold them in close contact with the food packages and permit a more efficient freezing operation.

While the above described device has been designed primarily for automatic action, means have been provided for hand operation. The main switch 132 may be turned to make contact with the manual contact Man and certain push buttons can be then operated to give step-by-step operation.

With the pusher in its fully retracted position the knob 97 makes contact with switches 102 and 103, thereby forming a circuit which keeps motor 106 running. Now, if the forward For button 185 is depressed, a circuit is completed which can be traced from one of the manual conductors 186, through the For switch contacts, to the For winding 77 of the forward solenoid, and the other side of the supply line 124. This operates the solenoid core 75 and moves the valve 74 to operate piston 67 (Fig. 7) and move the pusher in the first part of its cycle to push the boxes into the space between two platens. After the pusher has moved to the position denoted by FL, forward limit, or to FFL, full forward limit, the button is released and the reverse button Rev 187 is depressed. This button completes a circuit which may be traced from conductor 186 through the contacts under button 187, to the solenoid winding 76 of the Rev reverse solenoid, and core 79 is operated to move the valve piston 74 and cause the power piston 67 to bring the pusher back to its normal or starting position.

By successive operations of the For and Rev buttons an entire platen can be loaded. Next the Up manual button 188 is depressed and circuit is broken through contact arm 156 but closed through arm 190. This action completes a circuit which may be traced from a second manual line conductor 191, through the rear limit switch arm 103, to the conductor 192, switch arm 190, solenoid winding 93, and the line conductor 124. This circuit operates only when the pusher is all the way out and the rear limit switch 102, 103 in its operated condition. The Up solenoid core operates a valve similar to the valve shown in Fig. 7 and the platen array is slowly moved upward. It is necessary for the operator to listen for the sounds of the catches 157 and 158 as they snap into position under the platen. As soon as these sounds are heard the Up button 188 is released and the cycles of the pusher can be resumed by alternate depressing of the For and Rev buttons 185 and 187.

The manual buttons may be used to test the apparatus prior to starting the automatic operation.

Figure 11:
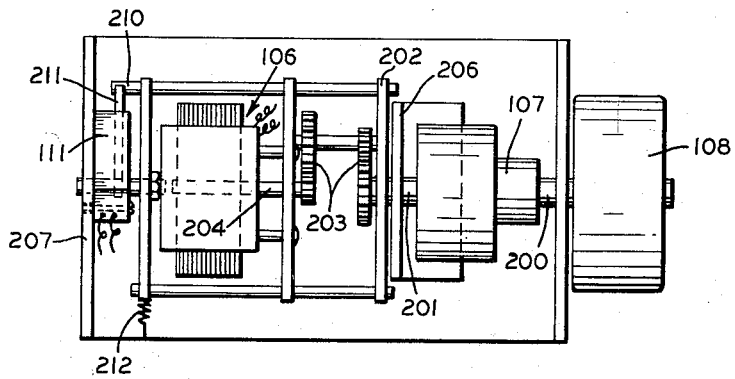
Fig. 11 is a plan view thereof.
Figure 12:
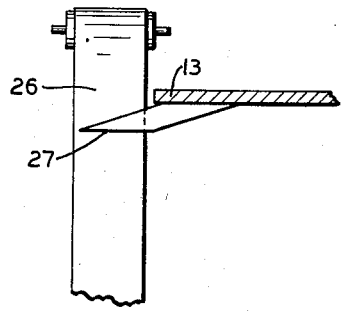
Fig. 12 is a broken plan view of the conveyor shown in Fig. 1 and showing the fixed stop at the downstream end of the charging opening.

Returning now to the details of construction of the sensing head shown in Figs. 10 and 11, wheel 108 may have a resilient covering of sponge rubber and its purpose is to actuate limit switch 111 when the column of boxes is stopped. This is conveniently done by mounting the friction wheel on a shaft 200 which has overrunning clutch 107 thereon. A drive shaft 201 aligned with shaft 200 is journalled in a frame 202 and a train of reducing gears 203 are driven by a motor shaft 204. The motor 106 is mounted in the frame and the frame itself is mounted for swinging movement in fixed frame members 206 and 207. Frame member 210 is arranged to engage arm 211 of limit switch 111.

The speed of the motor and the arrangement of the speed reduction unit is such as to have the peripheral speed of the friction wheel at all times less than the speed imparted to it due to contact with the boxes on the conveyor belt. In other words, so long as the boxes are traveling on the belt the friction wheel is driven by the boxes and not by the motor. When, however, travel of the boxes is stopped by fixed stop 27 the motor drive takes over, causing the motor to swing on its pivotal support, thus causing frame member 210 to contact 211 and actuate the limit switch. As soon as travel of the boxes again commences the overriding clutch permits the boxes to take over the drive of the friction wheel and the motor assembly returns to normal position due to gravity and it may be aided in this travel by a spring 212.

In actual practice the friction wheel may have, for instance, a circumference of 12 inches and the motor will drive the wheel at 40 R. P. M. This gives the friction wheel a peripheral speed of 480 inches per minute and in most instances the conveyor may travel at 500 inches per minute or upwards thereof.

While there have been described herein what are at present considered preferred embodiments of the invention, it will be obvious to those skilled in the art that many modifications and changes may be made therein without departing from the essence of the invention. It is therefore to be understood that the exemplary embodiments are illustrative and not restrictive of the invention, the scope of which is defined in the appended claims, and that all modifications that come within the meaning and range of equivalency of the claims are intended to be included therein.

What we claim is:

1. The combination with a constantly moving conveyor for articles to be moved to a stop where they form a group of predetermined number, of a sensing head including a friction wheel positioned upstream of the group, a primary drive for the wheel comprising the moving articles which are in contact with the wheel, a secondary drive therefor comprising a constantly rotating motor which rotates the wheel at a lesser speed than do the boxes, and an overrunning clutch between the motor and the wheel to allow the greater speed of rotation due to travel of the articles, a pivoted support for the motor to permit the motor to tilt when the articles cease to travel due to the group being filled and the secondary drive imparting rotation to the wheel, a circuit including means for operating on the group and a switch which closes the circuit upon contact with the tilted motor.

2. A conveyor system comprising a constantly moving conveyor for articles to be moved laterally therefrom by a pusher when a group of predetermined number is formed thereon, a sensing head including a friction wheel positioned upstream of the formed group, a primary drive for the wheel comprising the moving articles which are in contact therewith, a secondary drive therefor comprising a constantly rotating motor which rotates the wheel at a lesser speed than do the articles, and an overrunning clutch between the motor and the wheel to allow the greater speed of rotation due to travel of the articles, a pivoted support for the motor to permit the motor to swing thereon when the articles cease travel as a result of the secondary drive imparting rotation to the wheel after the group has been filled, a circuit including driving means for the pusher and a switch which closes the circuit upon contact with the swinging motor.

3. The combination with a freezer for boxes of food and provided with a horizontal charging slot, and a pusher assembly for moving the boxes through the slot, of a conveyor system for feeding groups of the boxes to the charging slot and discontinuing the feeding of a second group until a first group has been moved by the pusher assembly into the freezer, said system comprising a constantly moving conveyor for the boxes, a sensing head including a friction wheel positioned upstream of the charging slot, a primary drive for the wheel comprising the moving boxes which are in contact therewith, a secondary drive therefor comprising a constantly rotating motor which rotates the wheel at a lesser speed than do the boxes, and an overrunning clutch between the motor and the wheel to allow the greater speed of rotation due to travel of the boxes, a pivoted support for the motor to permit the motor to swing when the boxes cease travel due to the first group being filled and the secondary drive imparting rotation to the wheel, a circuit including driving means for the pusher and a switch which closes the circuit upon contact with the swinging motor.

4. The combination with a freezer for boxes of food and provided with a horizontal charging slot, and a pusher assembly for moving the boxes through the slot, of a conveyor system for feeding groups of the boxes to the charging slot and discontinuing the feeding of a second group until a first group has been moved by the pusher assembly into the freezer, said system comprising a constantly moving conveyor, a stop for the boxes at the downstream end of the slot, a sensing head including a friction wheel positioned upstream of the charging slot, a primary drive for the wheel comprising the boxes which move in contact therewith, a secondary drive therefor comprising a constantly rotating motor which rotates the wheel at a lesser speed than do the boxes, and an overrunning clutch connecting the motor shaft and the wheel to allow the greater speed of rotation due to travel of the boxes, a pivoted support for the motor to permit the motor to swing on said pivot as a result of the secondary drive imparting rotation to the wheel after the first group has been filled, a circuit including driving means for the pusher and a switch which closes the circuit upon contact with the swinging motor.

References Cited in the file of this patent

UNITED STATES PATENTS 2,782,902    Sloane _____ Feb. 26, 1957